(12) United States Patent
Chen et al.

(10) Patent No.: US 11,080,272 B2
(45) Date of Patent: Aug. 3, 2021

(54) ENTITY RESOLUTION TECHNIQUES FOR MATCHING ENTITY RECORDS FROM DIFFERENT DATA SOURCES

(71) Applicant: Microsoft Technology Licensing, LLC, Redmond, WA (US)

(72) Inventors: Yang Chen, Sunnyvale, CA (US); Liang Zhang, Fremont, CA (US); Haifeng Zhao, San Jose, CA (US); Jiashuo Wang, Mountain View, CA (US); Aparna Krishnan, Santa Clara, CA (US); Anand Kishore, San Jose, CA (US); Chencheng Wu, Los Altos, CA (US); John P. Moore, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 16/457,666

(22) Filed: Jun. 28, 2019

(65) Prior Publication Data
US 2020/0409945 A1     Dec. 31, 2020

(51) Int. Cl.
*G06F 16/242*     (2019.01)
*G06F 16/25*      (2019.01)
*G06F 16/2457*    (2019.01)

(52) U.S. Cl.
CPC ...... *G06F 16/2423* (2019.01); *G06F 16/2425* (2019.01); *G06F 16/24578* (2019.01); *G06F 16/25* (2019.01)

(58) Field of Classification Search
CPC .. G06F 16/2423; G06F 16/25; G06F 16/2425; G06F 16/24578
See application file for complete search history.

(56) References Cited

U.S. PATENT DOCUMENTS

| | | | |
|---|---|---|---|
| 2008/0154824 A1* | 6/2008 | Weir | G06N 7/005 706/45 |
| 2013/0018900 A1* | 1/2013 | Cheng | G06F 7/00 707/755 |
| 2014/0337358 A1* | 11/2014 | Mitra | G06F 16/248 707/748 |

* cited by examiner

*Primary Examiner* — Albert M Phillips, III
(74) *Attorney, Agent, or Firm* — Hickman Becker Bingham Ledesma LLP (57) ABSTRACT

Entity resolution techniques for matching entity records from different data sources are provided. In one technique, an entity record from a source database is identified along with multiple data items included therein. Each data item corresponds to an attribute of multiple source attributes. For one of the data items that corresponds to a first source attribute, multiple target attributes are identified. A first query is generated that includes the data items and associates the data item with each of the multiple target attributes. A second query that is different than the first query is also generated. Two searches are performed of a target database: one based on the first query and the other based on the second query. A scoring model generates multiple scores, one for each search result. It is determined whether the entity record matches an entity record in the target database based on the set of scores.

19 Claims, 5 Drawing Sheets

ENTITY RESOLUTION TECHNIQUES FOR MATCHING ENTITY RECORDS FROM DIFFERENT DATA SOURCES

CROSS-REFERENCE TO RELATED APPLICATION

This application is related to U.S. patent application Ser. No. 15/339,703, filed Oct. 31, 2016, the entire contents of which is hereby incorporated by reference as if fully set forth herein, under 35 U.S.C. § 120.

TECHNICAL FIELD

The present disclosure relates to multi-data source data management and, more particularly, to entity resolution techniques for finding matching records in multiple data sources.

BACKGROUND

The utility of a database is proportional to the accuracy and completeness of the data stored therein. For example, a database that stores data about people where multiple data fields are incomplete is less useful than a database that stores data about the same people where most or all of the data fields are filled in with accurate data.

Some enterprises have access to and update databases about individuals with whom they are interested in maintaining contact or cultivating relationships. However, the information of those individuals is relatively limited. The more information an enterprise knows about an individual, the more likely the enterprise is able to serve any needs of that individual.

One approach for an enterprise to supplement the information about an individual is to initiate a search of a public database of individuals, where the search query includes the information from the enterprise's database. However, there are multiple drawbacks of this approach. First, such a search is time consuming, requiring an enterprise user to perform multiple manual tasks for each individual in the enterprise's database, including copying the information from the database into a search field and sifting through potentially hundreds of search results. Second, the quality of search results tends to be very low since the enterprise user is typically unfamiliar with the dependency among multiple data fields in the source (enterprise's) database and dependency between data fields of the source database and the target database. Thus, without that knowledge, any search is suboptimal, yielding many irrelevant results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for matching entity records from one data source with entity records from another data source are provided. In one technique, a source entity record is retrieved and data items are extracted therefrom. A first query is generated where one of the data items is associated with multiple attributes (or data fields) of entity records from a target data source. A second query is generated that has larger scope and, thus, will result in more matching records than the first query. Results of both queries are scored using a ranking or scoring model. The ranked results are analyzed and one of the ranked results might be selected as the matching target entity record. Alternatively, none of the ranked results is selected, indicating that confidence in the results is low.

Embodiments improve computer-related technology; namely, search technology. Embodiments do not require as much user interaction as past approaches. For example, manually copying contents of a record from a source data source and pasting those contents into a search field of a search interface are not required. Also, embodiments automatically generate queries of a target database based on dependencies among data fields of the source database and dependencies between data fields of the source database and the target database. In this way, using knowledge of how data in the source database and the target database are related, more relevant search results are identified. Embodiments leverage machine learning techniques to improve the relevancy of results that are returned from the automatically generated queries.

System Overview

Figure 1:
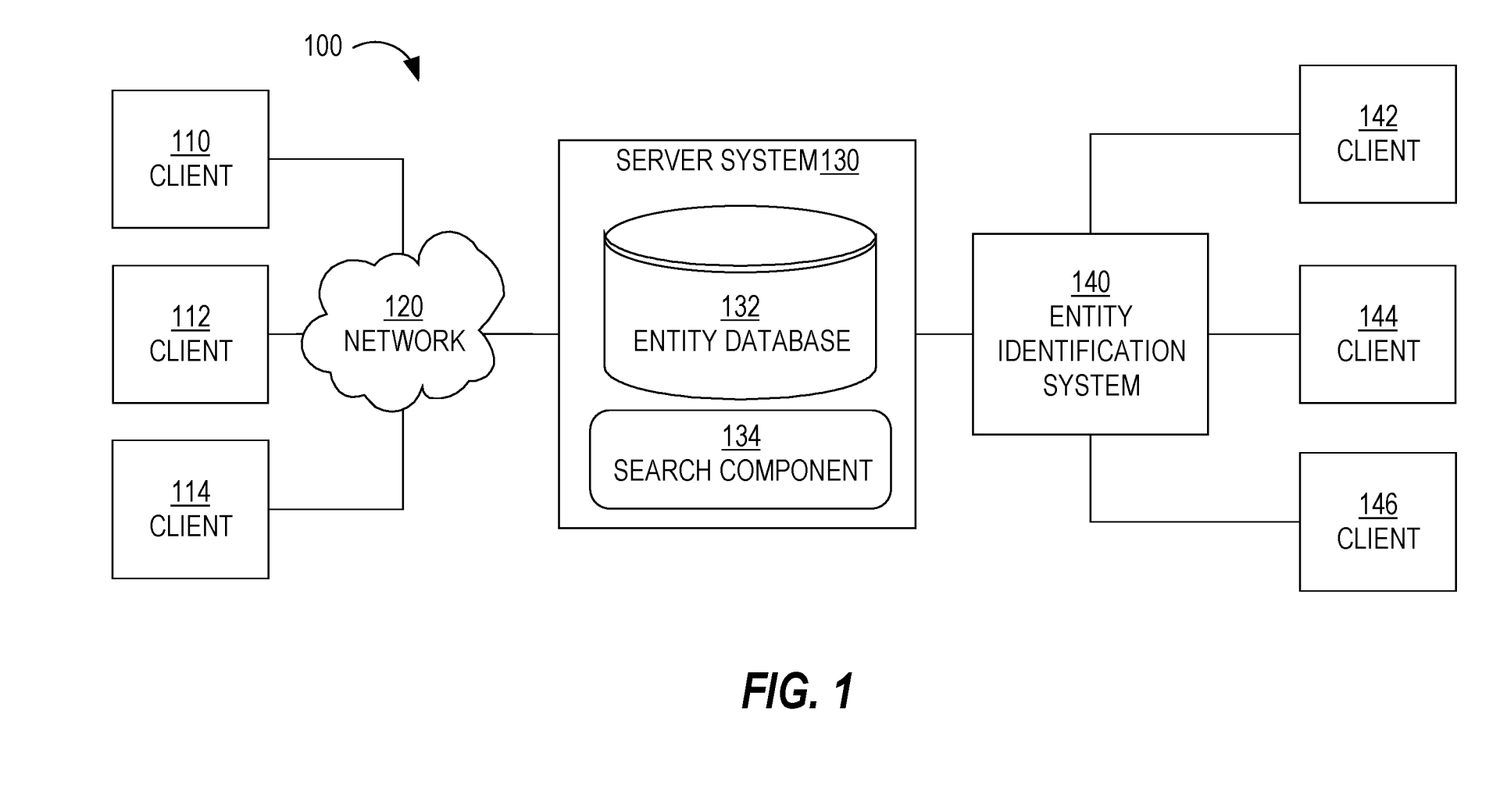
FIG. 1 is a block diagram of an example system for matching records from different data sources, in an embodiment.

FIG. 1 is a block diagram of an example system 100 for matching records from different data sources, in an embodiment. System 100 includes clients 110-114, a network 120, a server system 130, an entity identification system 140, and clients 142-146. Although depicted as separate systems, server system 130 and entity identification system 140 may be part of the same overall system and may be provided/owned/managed by the same entity.

Each of clients 110-114 is an application or computing device that is configured to communicate with server system 130 over network 120. Each of clients 142-146 is an application or computing device that is configured to communicate with entity identification system 140 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 (or entity identification system 140) and that executes within a web browser running on a computing device. Each of clients 110-114 may be implemented in hardware, software, or a combination of hardware and software. Although only three clients 110-114 are depicted as communicatively coupled to server system 130, system 100 may include many more clients that interact with server system 130 over network 120. Similarly, although only three clients 142-146 are depicted as communicatively coupled to entity identification system 140, system 100 may include many more clients that interact with entity identification system 140 over network 120.

Network 120 may be implemented on any medium or mechanism that provides for the exchange of data between clients 110-114 and server system 130 and (although not depicted in FIG. 1) between clients 142-146 and entity identification system 140. Examples of network 120 include, without limitation, a network such as a Local Area Network (LAN), Wide Area Network (WAN), Ethernet or the Internet, or one or more terrestrial, satellite or wireless links.

Client 142-146 may be similar to clients 110-114. Clients 142-146 interacts with entity identification system 140 (e.g., over one or more computer networks) to identify entities that the users of clients 142-146 may be interested in following and/or contacting.

Entity identification system 140 is communicatively coupled to server system 130. Entity identification system 140 communicates with server system 130 to retrieve data therefrom and update its own data and/or another database, as described in more detail herein.

Server System

Server system 130 includes an entity database 132 and a search component 134. Although depicted as a single element, server system 130 may comprise multiple computing elements and devices, connected in a local network or distributed regionally or globally across many networks, such as the Internet. Thus, server system 130 may comprise multiple computing elements other than the depicted elements.

Entity database 132 comprises information about multiples entities. Entity database 132 may be stored on one or more storage devices (persistent and/or volatile) that may reside within the same local network as server system 130 and/or in a network that is remote relative to server system. Thus, although depicted as being included in server system 130, each storage device may be either (a) part of server system 130 or (b) accessed by server system 130 over a local network, a wide area network, or the Internet.

In a social networking context, server system 130 is provided by a social network provider, such as LinkedIn. In this context, each entity record in entity database 132 includes a profile, each corresponding to a different entity. An entity may be a person, organization (e.g., a company, a charity, a non-profit organization, a government agency, an alumni group, etc.), a group of people, or an association. A profile for a person may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

A profile of an organization, such as a company, may include a company name, an address of the company, a number of employees, a listing of principals or chief executives of the company, a description of any current job openings, and a description of products or services provided by the organization.

Some data within a profile (e.g., a user's work history) may be provided by the user (or representative of the organization/association) while other data within the profile (e.g., skills and endorsements of a user) may be provided by a third party, such as a "friend," connection, or colleague of the user (in the case of user profiles) or customers/interested parties of the organization (in the case of organization profiles). For example, a user may register with a social network service and provide personal information (in a digital profile of the user) in exchange for the ability to virtually connect with other users of the social network service and take advantage of features provided by the social network service, such as the ability to view company profiles and other users' profiles. As a similar example, a representative of an organization may register with the social network service and provide information about the organization (in a digital profile of the organization) so that users of the social network service can learn about the organization, can follow the organization, and/or subscribe to messages issued by (and/or about) the organization.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account or profile. Access data indicates which users, groups, or devices can access or view the profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While many examples herein are in the context of social networking, embodiments are not so limited.

Search component 134 includes an interface to allow users and/or automatic processes to initiate searches of entity database 132 and receive results of those searches. Thus, search component 134 may provide a user interface to allow users of clients 110-114 to search entity database 132 and/or provide an API to allow programs or processes in entity identification system 140 to send queries that search component 134 processes against data stored in entity database 132.

Entity Identification System

Figure 2:
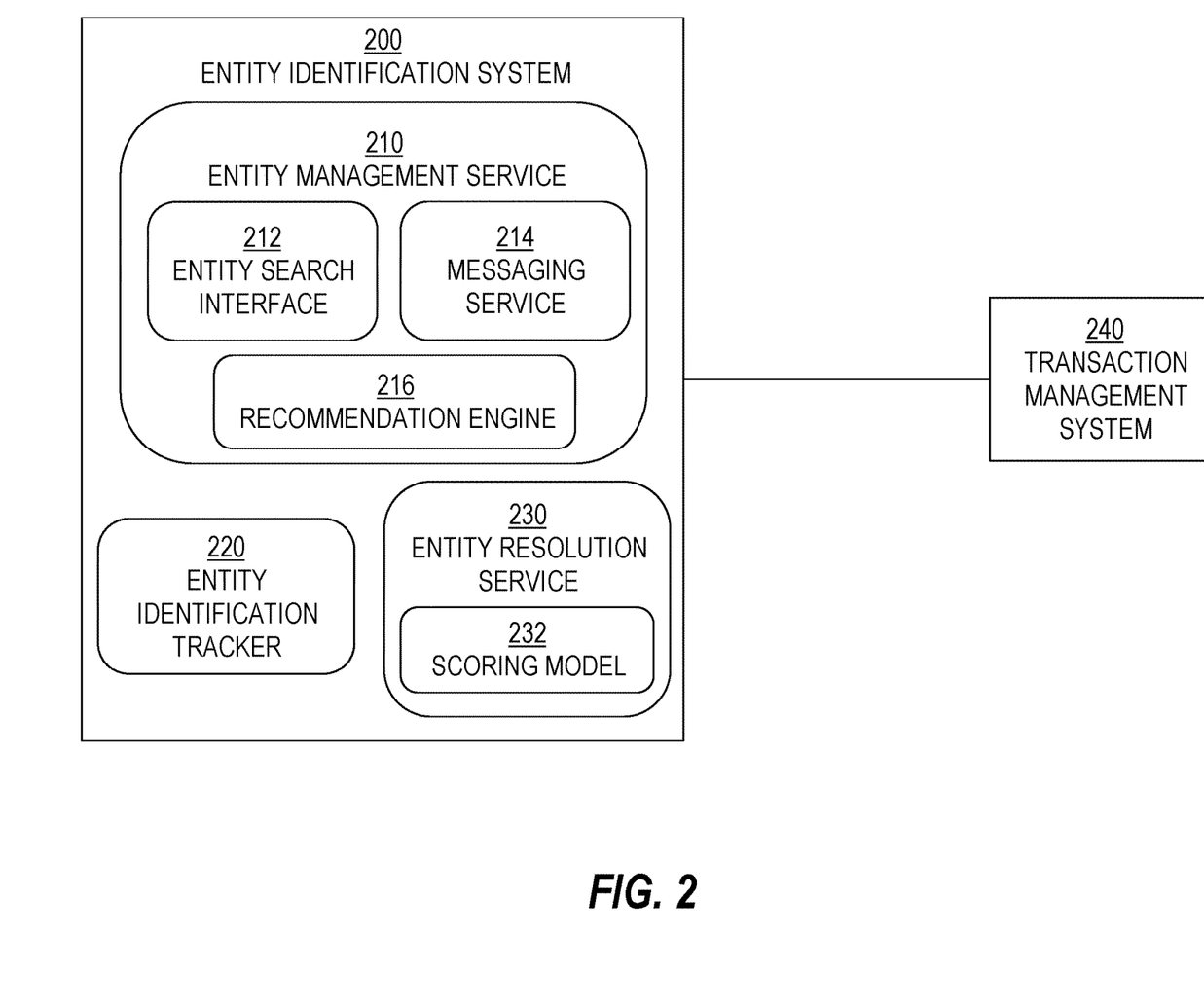
FIG. 2 is a block diagram that depicts an entity identification system, in an embodiment.

FIG. 2 is a block diagram that depicts an entity identification system 200, in an embodiment. Entity identification system 200 corresponds to entity identification system 140. Entity identification system 200 includes an entity management service 210, an entity identification tracker 220, and an entity resolution service 230. Entity management service 210 may be implemented in software, hardware, or any combination of software and hardware. Although entity management service 210 is depicted as including certain features, all embodiments are not limited to requiring these features and some embodiments may include additional features not described herein.

Entity management service 210 may be implemented as a web application, a portion of which operates in entity identification system 200 and another portion of which operates in a web browser executing on a client device. Thus, the web browser transmits a HTTP request over a network (e.g., the Internet) in response to user input (e.g., entering of text and selection of a graphical button) that is received through a user interface provided by the web application and displayed through the web browser. Entity management service 210 receives the input, performs one or more operations, and returns one or more results in an HTTP response that the web browser receives and processes. Instead of a web browser approach, a client-side application is installed and executes on a client device and is configured to communicate with entity management service 210 over a network. An example of entity management service 210 is Sales Navigator™, provided by LinkedIn.

As noted previously, entity management service 210 includes multiple features that a user of the service might leverage. For example, entity management service 210 includes entity search interface 212 that allows users to search for information about entities stored in entity database 132. Example search criteria for searching individuals include name of individual, industry, job title, academic institution attended, academic degree earned, level of schooling (e.g., high school graduate, some college, PhD, etc.), geographic area (e.g., city and state), name of current employer, job function, seniority level, number of years in current job position, number of years at current employer, skills, name of previous employer. Example search criteria for searching organizations include name of organization, industry, geographic area, size of organization (e.g., number of employees), and recent profit or revenue (e.g., Q4 revenue from SEC filings or other public sources).

In an embodiment, entity management service 210 includes an interface that allows a user (or representative of a third-party organization) to select one or more preferences. Such preferences may be selected upon the user's registration (or the third-party organization's registration) with entity identification system 200 and/or some time later after registration and use of entity identification system 200. Entity management service 210 uses the selected preferences to automatically perform searches for the user. Additionally or alternatively, entity management service 210 uses the selected preferences to automatically select corresponding search preferences when searching for leads or accounts. Thus, the user does not have to select the same search preferences each time the user wants to search for relevant leads or accounts.

Entity management service 210 includes a messaging service 214 that includes an interface that allows users to create and send messages to individuals (leads). A message may be an email message that is transmitted to an email account of the individual, a text message that is transmitted over a cellular network to a mobile device (e.g., smartphone) of the individual, or an application message that is transmitted to the individual's account that is maintained by the same party or entity that operates entity identification system 200.

Entity management service 210 includes a recommendation engine 216 that identifies entities with which a user of service 210 might be interested. Recommendation engine 216 may determine potential entities of interest for a user based on one or more factors, such as past searches that the user initiated through entity search interface 212, explicit criteria or interests that the user selected, and identities of past entity identities that the user selected/saved. For example, is a user of entity management service 210 saved an identity for entity A, recommendation engine 216 may determine that entity B is similar in one or more ways to entity A and, as a result of the determination, present information about entity B to the user. As another example, upon registration with entity management service 210, a user selects criteria of entities that the user is interested in, such as job title, organization size, and years of experience. In response, recommendation engine 216 performs a search (e.g., periodically, such as daily) and presents identities of entities to the user. As another example, recommendation engine 216 records a search that a user initiates through entity search interface 212 and causes the search to be performed automatically (i.e., not in response to user input) sometime later, such as the day after the search is performed. Recommendation engine 216 compares the results of the initial search with the results of the subsequent search to determine any differences. If an entity did not appear in the results of the initial search but appears in the results of the subsequent search, then recommendation engine 216 causes an identity of that entity to be presented to the user.

Transaction Management System

Entity identification system 200 may include or be affiliated with a transaction management system (TMS) 240 that stores information about individuals (or contacts), organizations (or accounts), and opportunities (or deals). An "opportunity" is a combination of one or more individuals (or contacts), one or more organizations (or accounts), and one or more products or services that are being sold to the one or more individuals as representatives of the one or more organizations (typically, a single organization per opportunity).

An example of transaction management system 240 is a customer relationship management (CRM) database system. Transaction management system 240 may be remote relative to entity identification system 200, but may be accessible to entity identification system 200 such that entity identification system 200 can store information into transaction management system 240 and/or retrieve data from transaction management system 240 through, for example, one or more application programming interface (API) calls. For example, TMS 240 may be hosted in the "cloud" and managed by a third-party TMS provider that allows multiple enterprises to use its cloud service to manage their respect TMSs. Thus, if different enterprises leverage entity identification system 200 and register with entity identification system 200, then each account of those enterprises hosted at entity identification system 200 may be linked with, or associated with, a different TMS.

"Transaction" may refer to an actual or prospective business transaction involving one or more entities and one or more representatives of each entity. Transaction management system 240 allows representatives of an organization that is selling or marketing one or more products or services to keep track of which individuals and accounts are of interest with respect to selling a particular product or service. For example, a contact record for an individual in transaction management system 240 may include a first name, last name, job title, an employer name, an email address, a date of first contact with the individual, a date of most recent contact with the individual, a notes field indicating what was discussed in the latest electronic or verbal exchange with the individual, a product name or service name in which the individual may be interested, and a sales stage. As another example, an account record for an organization (e.g., a company) may include an organization name, a geographic location, a mailing address, a phone number, a list of principals at the organization, and a list of products/services that are being marketed or sold to this organization.

Entity management service 210 may include a sync feature that allows information about individuals and organizations to be automatically saved to transaction management system 240 in a single user selection. Such a sync feature may be presented as a selectable graphical icon that is adjacent to: a search result corresponding to an entity; a message from an individual; or a recommendation corresponding to an entity.

An individual that has an associated contact record in transaction management system 240 may be associated with (as indicated in the contact record) one of multiple stages with respect to an (sales) opportunity, such as a prospect stage, an opportunity stage, and a customer stage. An individual in a prospect stage is one that is not yet a customer and has less than a certain number of contacts with a sales representative (e.g., two). An individual in an opportunity stage is one that is not yet a customer but that has exhibited interest in a certain product/service and/or has more than a certain number of contacts with a sales representative (e.g., three). If an individual is associated with multiple opportunities (and, thus, multiple products/services) simultaneously, then the individual may be associated with multiple stages simultaneously, but with respect to different opportunities.

If the entity that operates entity identification system 200 contracts with third-party users or organizations who seek access to entity database 132, then entity identification system 200 may be affiliated with multiple transaction management systems, each corresponding to a different organization that sells or markets a product or service. Each third-party user or organization (hereinafter simply "third-party organization") is associated with a contract that specifies a number of seats for the third-party organization. A "seat" may correspond to a unique login for an individual affiliated with (e.g., employed by) the third-party organization. Thus, ten different representatives of the third-party organization may have their own login to entity identification system 200 and be able to access entity database 132 through entity search interface 212. Also, each seat may be associated with its own history of actions that a corresponding representative initiated with respect to entity management service 210 (or, as a more specific example, entity search interface 212). Examples of actions that may be individually tracked include social network actions (e.g., comment, like, share) by the corresponding representative (or seat holder), messages that the corresponding representative sent and/or received along with identities of the recipients/senders of the messages, a number of searches by the seat holder, the search criteria of each search, search results identified based on each search, tags pertaining to seat holders, and any data that the corresponding seat holder supplied, such as notes pertaining to an entity, entities that the seat holder selected for saving, and sales preferences.

Entity Identification Tracker

Entity identification tracker 220 stores data that includes identities of entities with which a user (e.g., a representative of a third-party organization or seat holder) has interacted in some way, whether actively or passively. For example, a user might send, to a particular entity, an electronic message through entity management service 210. If the particular entity responds to the message, then the user selects a graphical icon that causes entity identification tracker 220 to save an identifier of the particular entity for the user. The identifier is stored in a set of saved entity identifiers. In a related example, if the particular entity responds to the message, then receipt of the response triggers entity identification tracker 220 to store the identifier in the set of saved entity identifiers. In a related example, the initial message addressed to the particular entity is sufficient to cause entity identification tracker to store the identifier of the particular entity in the set.

As another example, a user initiates a search through entity search interface 212. In response to the search, entity search interface 212 identifies results that include identities (e.g., names) of multiple entities and those identities are presented on a screen of a computing device operated by the user. The entities may be individuals and/or organizations. The user may select a graphical icon adjacent to one or more of the identities, which causes entity identification tracker 220 to store the corresponding entity identifier(s) in the set of saved entity identifiers. Alternatively, the user may select another graphical icon that causes entity identification tracker 220 to store, in the set of saved entity identifiers, entity identifiers of all entities in the search results. In this way, a user is not required to individually select entity identities.

Entity Resolution Service

Entity resolution service 230 that identifies entity records in one or more source data sources (e.g., TMS 240) and matches one or more of those entity records with one or more entity records in one or more target data sources (e.g., entity database 132). Entity resolution service 230 performs the matching using one or more searches of the target data source and a scoring model 232. The matching involves constructing, based on a source entity record, one or more search queries that will be executed against the target data source.

A search query (or just "query") executed against a target data source results in zero or more search results. In cases where at least one search result is identified as a result of a query, scoring model 232 generates or computes a score for each search result. The score may represent a likelihood that the search result represents a matching record. Thus, the score may be a value between 0 (indicating no match) and 1 (indicating a positive match), or between 0 and 100. Alternatively, a score may not have an upper bound, but may be used to rank the corresponding search result to other search results produced from the same query.

Scoring Model

Even though scoring model 232 is depicted as being part of entity resolution service 230, scoring model 232 may be part of server system 130. Scoring model 219 may be a machine-learned model that is trained based on past searches of the target data source (or another data source of similar target entity records) where each training instance corresponds to a different search result and a label of the training instance indicates whether the corresponding search result was a match. The label may be specified by a human labeler that reviews search results from a query and indicates which search result represents a match. Additionally or alternatively, a label may be inferred based on an end-user action that selects a search result in a search result set and, optionally, where the end user performs one or more additional actions indicating that the selected search result is a correct match.

Additionally or alternatively, a label may be inferred based on an end-user action that accepts or rejects a change indicator that is displayed in association with (or adjacent to) a source entity record. For example, a match between a source entity record and a target entity record may be automatically detected. As a result of the match, the source data source is updated to include a change indicator that is associated with the source entity record. When one or more attributes of the source entity record are displayed, then the change indicator is concurrently displayed therewith. The change indicator indicates that the source entity record may be out of date, without the corresponding change reflected in the source entity record. The change indicator may also indicate which data field of the source entity record is out of date and/or when the source entity record (or data field) was detected to be out of date. A user interacting with a user interface of the source data source may select an option that accepts the change or an option that rejects the change. Additionally, the user interface may include a plug-in that retrieves content from the target entity record and displays the content concurrently with at least a portion of the source entity record. A user may view the contents of the target entity record and make a decision (e.g., accept the change or reject the change) whether the entity associated with the target entity record is the same as the entity of the source entity record.

The features of scoring model 219 are based on the underlying data fields of the source data source and the target data source. In the context of matching entity records where the entities represent people, example features include a number of terms from a source entity record that match a data item from a first name field in a target entity record, a number of terms from a source entity record that match a data item from a last name field in a target entity record, a number of terms from a source entity record that match a data item from a current employer field in a target entity record, a number of terms from a source entity record that match a data item from a past employer field in a target entity record, a number of terms from a source entity record that match a data item from a current job title field in a target entity record, a number of terms from a source entity record that match a data item from a past job title field in a target entity record, and a number of terms from a source entity record that match a data item from a body field in a target entity record.

Examples of similar features include a fraction/percentage of the terms from a source entity record that match a data item from a first name field in a target entity record, a fraction/percentage of the terms from a source entity record that match a data item from a last name field in a target entity record, etc. A fraction/percentage of query terms matching in a data field of a target entity record is calculated by dividing (a) the number of query terms matching in the data field of the target entity record by (b) the number of query terms in the query.

Another example of a feature includes a frequency of query terms matching in a particular data field (e.g., body, first name, last name, current company name, or previous job title) of a target entity record. Such a frequency is calculated by summing all the matched terms' term frequency. For example, for a query "software google" where "software" matched two times in the body field and "google" matched once in the body field, the feature value for the data field "body" would be three.

Examples of similar features include a number of tagged first name terms from a source entity record that match a data item from a first name field in a target entity record, a number of last name terms from a source entity record that match a data item from a last name field in a target entity record, etc.

Examples of other features include a Jaccard similarity for each of one or more data fields of a target entity record, such as the first name data field, last name data field, current job title, etc. A Jaccard coefficient measures the similarity between finite sample sets and is defined as the size of the intersection divided by the size of the union of the sample sets. A Jaccard feature value may be computed by dividing (1) the number of query terms that match the term(s) in a data field of a target entity record by (2) the difference of (i) the sum of the number of query terms and the number of terms in the data field and (ii) the number of query terms that match the term(s) in the data field.

Another example type of feature is a relative importance of the matched query terms with respect to the query itself and the data fields in a target entity record. Again, example data fields of a target entity record include first name, last name, headline, current job title, previous job title, etc. Feature values are calculated by dividing (1) the square of the number of query terms that match a data field of a target entity record by (2) the product of the number of query terms and the number of terms in the data field of the target entity record. For example, if the query is "Smith" and the name of a target entity record is "John Smith," then the value of this feature for this name field would be 0.5.

Other examples of features include whether the first name and last name fields of a target entity record match, respectively, the first and last name fields of a source entity record, whether the query has a first name, whether the query has a last name, whether the query has a company or employer name, whether the query has a job title, whether the query has a geographic indicator, whether all query terms match in a particular data field (this would be a positive feature value for a maximum of one data field in a target entity record and a negative value for each other data field in the target entity record), a number of current positions indicated in the target entity record, a number of previous positions indicated in the target entity record, a number of education institutions indicated in the target entity record.

Overview of Matching Records from Different Data Sources

Figure 3:
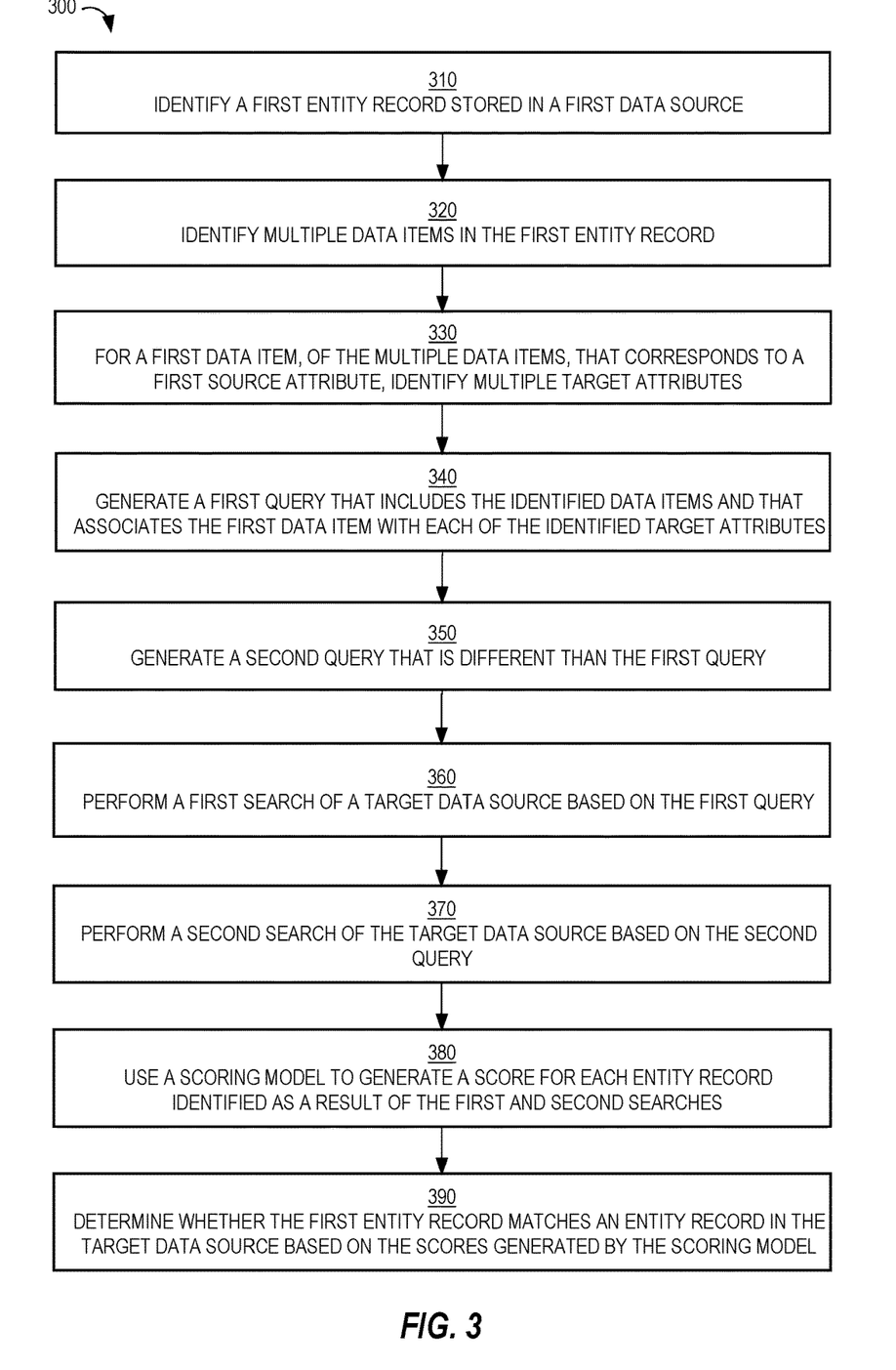
FIG. 3 is a flow diagram that depicts an example process for matching records from different data sources, in an embodiment.

FIG. 3 is a flow diagram that depicts an example process 300 for matching records from different data sources, in an embodiment. Process 300 may be implemented by different components of system 100 or different components of entity identification system 200 and server system 130.

At block 310, a first entity record stored in a first data source is identified. For example, a first record in TMS 240 is identified. Block 310 may be initiated in response to a scheduled run (e.g., daily, weekly). For example, each entity record in the first data source is identified at the end of each day and process 300 is performed relative to each such entity record. Such a process ensures that if (1) a target entity record, in a second (or target) data source (e.g., entity database 132), that does not match the first entity record on day 1, but is (2) created or updated on day 2 such that the first entity record would match the target entity record, then that match is identified sooner than later.

Additionally or alternatively, block 310 may be initiated in response to detection of an update to a record in the first data source. For example, if a job title field in the first entity record is updated, then that entity record is identified. Any data field within an entity record may trigger process 300 with respect to that entity record. The addition of certain information in a source entity record or the increase in accuracy of the source entity record makes it more likely that an accurate matching target entity record will be found.

Additionally or alternatively, block 310 may be initiated in response to detection of a certain number of updates (e.g., inserts of new records and/or modifications of existing records) in the second (or target) data source. For example, if two hundred new profiles are created in the second data source (e.g., entity database 132), then process 300 is performed with respect to each entity record in the first data source, or at least entity records that have not already been matched to a target entity record in the second data source. As another example, if three thousand existing profiles are updated in the second data source (e.g., entity database 132), then process 300 is performed with respect to each entity record in the first data source, or at least entity records that have not already been matched to a target entity record in the second data source.

At block 320, multiple data items in the first entity record are identified. Each data item corresponds to a different attribute or data field in the first data source. Example attributes include first name, last name, job title, and employer or company name. Some attributes or data fields of entity records in the first data source may be ignored.

At block 330, for a first data item, of the multiple identified data items, that corresponds to a first source attribute, multiple target attributes are identified. For example, for a first name indicated in the first entity record, a first name attribute/data field and a last name attribute/data field in a target data source are identified. As another example, for a job title indicated in the first entity record, (1) a current job title attribute/data field in a target data source and (2) a previous job title attribute/data field in the target data source are identified. Block 330 may be performed for multiple data items in the first entity record.

At block 340, a first query is generated that includes the identified data items and that associates the first data item with each of the identified target attributes. For example, "Dexter" is a first name in the first entity record and "Smith" is a last name in the first entity record. The first query may include "{Dexter; [firstName], [lastName]}&&{Smith; [firstName], [lastName]}," where "Dexter" must be found in either the first name field or the last name field of a target entity record and "Smith" must be found in either the first name field or the last name field of the same target entity record. Alternatively, the logic regarding first and last names from the first entity record may be as follows: "({Dexter; [firstName]}&&{Smith; [lastName]})||({Dexter; [lastName]}&&{Smith; [firstName]})."

As another example, "Software Engineer" is indicated as a job title in the first entity record. The first query may include "(currentTitle==Software Engineer)|| (previousTitle==Software Engineer)" or "{Software Engineer; [currentTitle], [previousTitle]}," depending on the syntax of the query language. Thus, each query term is "tagged" with one or more data fields of a target data source. Such an expanded or tagged query is more relevant than a query that simply lists query terms without associating any of the query terms with a data field designation.

Another example of a data item that the first query may require in a matching target entity record is geographic location. For example, if the first entity record includes a geographic location, then the first query may require a target entity record to also include the same geographic location, or a geographic location that subsumes (or includes) the geographic location of the first entity record (e.g., California is in the United States or Paris is in France). The first query includes a tag or attribute that label the geographic location as a geographic location.

At block 350, a second query is generated that is different than the first query. The second query has more relaxed conditions than the first query. For example, the first query may require (a) a job title and a company name from the first entity record to be, respectively, in the current job title field and the current company field of a target entity record, (b) the job title and the company name from the first entity record to be, respectively, in the previous job title field and the previous company field of a target entity record, or (c) the job title and the company name from the first entity record to be, respectively, in the previous job title field and the current company field of a target entity record. In contrast, the second query may only require a target entity record to include (i) the job title from first entity record in a previous job title field, (ii) the job title from the first entity record in a current job title field, (iii) the company name from the first entity record in the current company field, or (iv) the company name from the first entity record in the previous company field.

At block 360, a first search of a target data source is performed based on the first query. The first search results in a first set of results. In some instances, the first search might yield no search results. Block 360 may involve entity management service 210 sending the first query to search component 134, which generates the first set of results and returns the first set of results to entity management service 210.

The determination of whether a query term is found in a target entity record or in a particular data field of a target entity record may be performed in one or more ways. For example, search component 134 performs text-to-text comparisons. A data item from the first entity record may first be analyzed for errors and/or normalized (e.g., by search component 134 or by a component of entity identification system 200). For example, any capitalizations may be removed and any misspellings may be corrected by comparing the data item with known correct (or standardized) data items of the same type and replacing the data item with a known correct data item if the known correct data item is within a certain number of changes N of the original data item. For example, "Software Enginear" may be replaced with "Software Engineer."

As another example, identifiers may be compared instead of text. For example, a company name listed in the first entity record may be mapped to a company identifier and then, at query execution time, the company identifier is compared to company identifiers indicated in (or associated with) multiple target entity records. For example, when users fill out a personal profile, they may spell out a company name or a job title. While doing so, server system 130 may present standardized names of known companies or job titles, one of which the user may select (and may be required to select). Each standardized name is mapped to an identifier that uniquely identifies the entity (e.g., whether a company or a job title) relative to other entities of the same type.

As another example, instead of just comparing identifiers of source and target records or just comparing text of source and target records, both types of comparisons are performed. Thus, one or more identifiers of a source record are compared to one or more identifiers of a target record and one or more text data items of a source record are compared to one or more text data items of a target record. If, when comparing a source record to a target record, there is a text match but not an identifier match, then a score for such a match may be lower than if there was a identifier match.

In an embodiment, a value in a data field of the first entity record is expanded to multiple distinct values. For example, "software engineer" may be expanded to "software developer," "programmer," and "software designer." Then, during a search, each of the expanded values is compared to a value in the appropriate data field of a target entity record. As long as at least one of the expanded values matches a value in a current job title field or a previous job title field of a target entity record, that target entity record is considered at least a partial match. Other query terms and conditions of the query also need to be considered when determining whether that target entity record represents a candidate match that should be scored.

At block 370, a second search of the target data source is performed based on the second query. The second search results in a second set of results. Block 370 may involve entity management service 210 sending the second query to search component 134, which generates the second set of results and returns the second set of results to entity management service 210.

At block 380, a scoring model is used to generate a score for each result in the first and second sets of results. For example, scoring model 219 generates a score for each target entity record that was identified by at least one of the searches. Block 390 may involve deduplicating the union of the first and second sets of results since some search results from the second query may be the same as some search results from the first query. Each result in the second set of results may be ranked no higher than any result in the first set of results. In some cases, no result is identified as a result of the first search.

At block 390, it is determined whether the first entity record matches an entity record in the target data source based on the scores generated by the scoring model. A result of block 390 may be one target entity record or no target entity record. Block 390 may involve identifying the top N target entity records ranked by score, where N is two, three, or some other positive integer. If the top N have very similar scores (e.g., within 5% or 10% of each other), then no target entity record is identified as a match. Thus, even if, for example, the top three ranked target entity records have relatively high scores, the fact that they have similar scores indicates that the system is not "confident" regarding which target entity record is the best matching record.

Additionally or alternatively, block 390 may involve comparing score(s) of the top ranked target entity record(s) with a threshold value. If no score of a search result set is greater than the threshold value, then no target entity record is identified as a match.

In an alternative embodiment, blocks 350 and 370 are skipped. In other words, no second query is generated or executed.

Overview of Generating a Query

Figure 4:
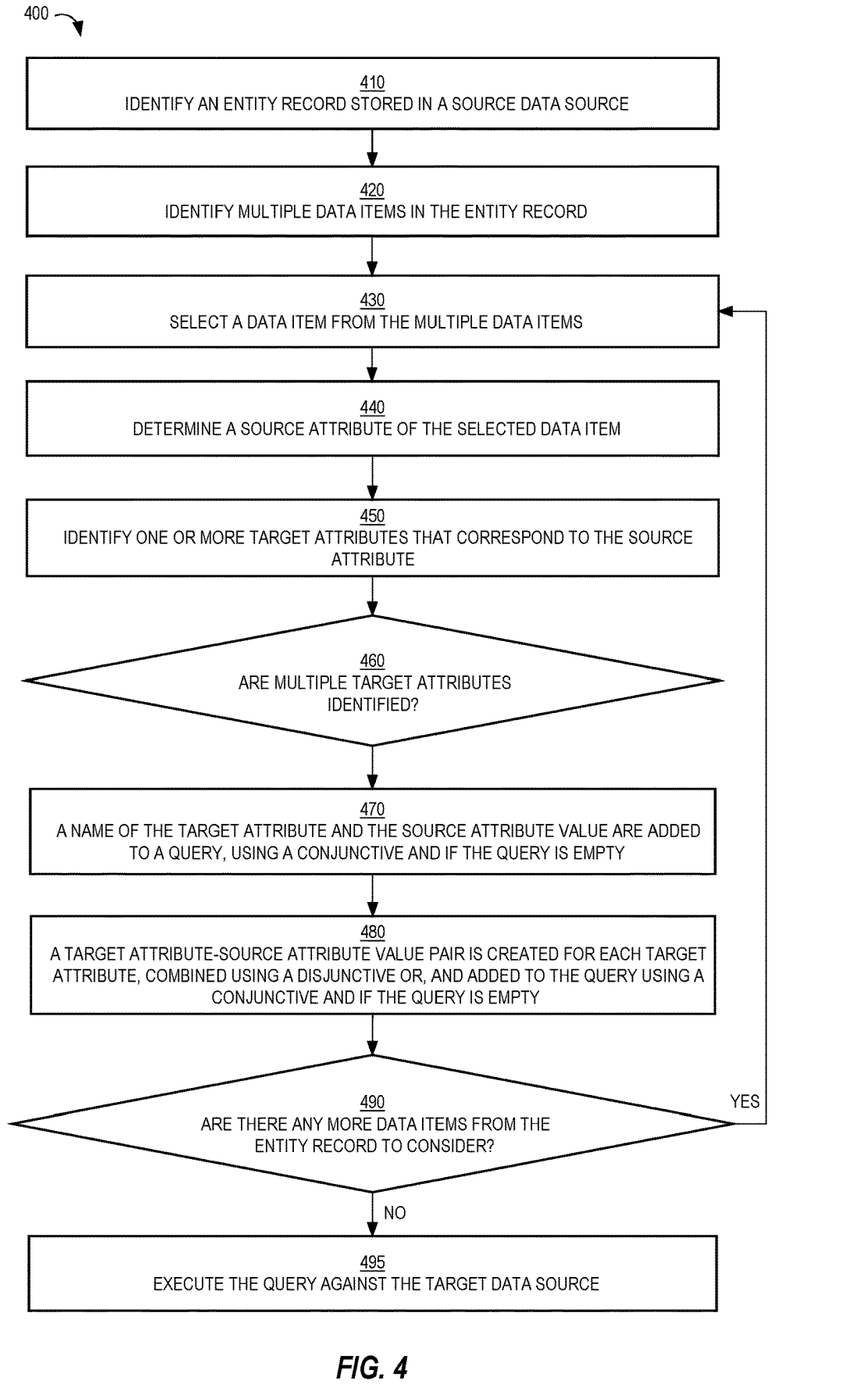
FIG. 4 is a flow diagram that depicts an example process for generating a query of a target data source based on an entity record from a source data source, in an embodiment.

FIG. 4 is a flow diagram that depicts an example process 400 for generating a query of a target data source based on an entity record from a source data source, in an embodiment.

At block 410, an entity record is identified. Block 410 may be similar to block 310.

At block 420, multiple data items in the entity record are identified. Block 420 may be similar to block 320.

At block 430, a data item from the multiple data items is selected. Block 430 may involve selecting the data item randomly. Alternatively, block 430 may involve selecting the data item in a particular order. For example, the source attributes of the entity record may be ordered, which may dictate which data item is selected first.

At block 440, a source attribute of the selected data item is determined. For example, the source attribute may be one of multiple fields of each entity record. Example source attributes include last name, first name, job title, and company name. The source attribute may be of any data type, such as a string, an array of characters, or a floating-point number.

At block 450, one or more target attributes that correspond to the source attribute of the selected data item are identified. The target attributes are from a target data source that is different than the source data source. Block 450 may involve identifying multiple target attributes. Block 450 may involve using a mapping that maps source attributes to target attributes. Some source attributes may map to a single target attribute while other source attributes may map to multiple target attributes. A source attribute-target attribute pair may have different names. For example, a source attribute may be "job title" while the target attributes that map to the source attribute are named "previous job title" and "current job title."

At block 460, it is determined whether multiple target attributes were identified. If not, then process 400 proceeds to block 470; otherwise, process 400 proceeds to block 480.

At block 470, a name of the target attribute and the source attribute value is added to a query. Initially, during the first iteration of block 470, the query may be empty. For example, if the first name source attribute is the first source attribute considered in process 400 and the first name source attribute maps to just the first name target attribute, then the first iteration of block 470 may add the predicate "{Dexter; [firstName]}" as the initial predicate.

During the second iteration of block 470, adding a name of the target attribute and the source attribute value includes adding a conjunctive AND. For example, if the last name source attribute is the second source attribute considered in process 400 and the last name source attribute maps to just the last name target attribute, then the second iteration of block 470 may add the conjunctive AND and then the predicate "{Smith; [lastName]}" to the initial predicate to form the following query: "{Dexter; [firstName]}&&{Smith; [lastName]}".

At block 480, names of the target attributes and the source attribute value are added to a query. Block 480 involves creating multiple target attribute-source attribute value pairs, one for each target attribute identified in block 450.

Initially, during the first iteration of block 480, the query may be empty. For example, if the first name source attribute is the first source attribute considered in process 400 and the first name source attribute maps to the first name target attribute and the last name target attribute, then the first iteration of block 480 may add "({Dexter; [firstName]}||{Dexter; [lastName]})" as the initial (compound) predicate, where the individual predicates corresponding to the different target attributes are combined using a disjunctive OR.

During the second iteration of block 480, adding names of multiple target attributes and a source attribute value includes adding a conjunctive AND. For example, if the last name source attribute is the second source attribute considered in process 400 and the last name source attribute maps to the first name target attribute and the last name target attribute, then the second iteration of block 480 may add the conjunctive AND and the predicate "({Smith; [firstName]}||{Smith; [lastName]})" to the initial predictate to form the following query: "({Dexter; [firstName]}||{Dexter; [lastName]})&&({Smith; [firstName]}||{Smith; [lastName]})."

At block 490, it is determined whether there are any more data items from the source entity record that have not yet been considered. If so, then process 400 returns to block 430 to select a different data item; otherwise, process 400 ends. This means the query that has been formulated is complete and is ready to be executed against the target data source.

At block 495, the query is executed against the target data source.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
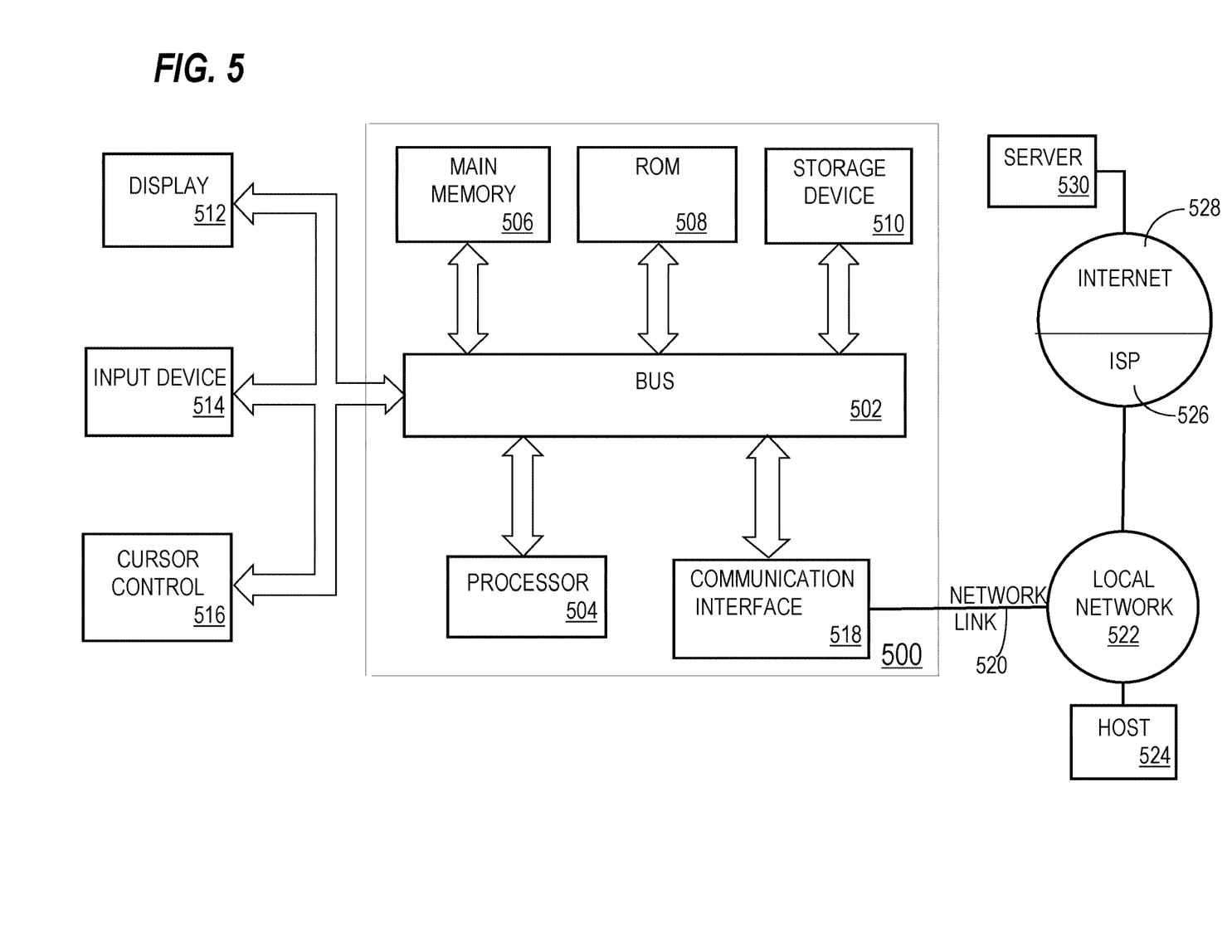
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
identifying a first entity record from a source database;
identifying, in the first entity record, a plurality of data items, each of which corresponds to an attribute of a plurality of source attributes;
for a first data item, of the plurality of data items, that corresponds to a first source attribute of the plurality of source attributes, identifying a plurality of target attributes;
generating a first query that includes the plurality of data items and that associates the first data item with each of the plurality of target attributes;
generating a second query that is different than the first query;
performing a first search of a target database based on the first query, wherein the first search results in a first set of results;
performing a second search of the target database based on the second query, wherein the second search results in a second set of results;
using a scoring model to generate a set of scores, one score for each result in the first and second sets of results;
determining whether the first entity record matches an entity record in the target database based on the set of scores generated by the scoring model;
wherein the method is performed by one or more computing devices.

2. The method of claim 1, further comprising:
for a second data item, of the plurality of data items, that corresponds to a second source attribute of the plurality of source attributes, identifying a second plurality of target attributes;
generating a first plurality of predicates, one for each target attribute of the second plurality of target attributes, wherein each predicate in the first plurality of predicates includes the second data item and is combined with each other predicate of first plurality of predicates with a disjunctive OR;
for a third data item, of the plurality of data items, that corresponds to a third source attribute of the plurality of source attributes, identifying a third plurality of target attributes;
generating a second plurality of predicates, one for each target attribute of the third plurality of target attributes, wherein each predicate in the second plurality of predicates includes the third data item and is combined with each other predicate of second plurality of predicates with the disjunctive OR;
wherein the second query includes the first plurality of predicates and the second plurality of predicates, wherein the first plurality of predicates and the second plurality of predicates are combined with the disjunctive OR.

3. The method of claim 1, wherein:
generating the first query that includes generating a plurality of predicates, each predicate corresponding to a different data item-target attribute pair and including the first data item and a different target attribute of the plurality of target attributes;
the plurality of predicates are combined with a disjunctive OR.

4. The method of claim 1, further comprising:
for a second data item, of the plurality of data items, that corresponds to a second source attribute of the plurality of source attributes, identifying a second plurality of target attributes;
wherein the first query associates the second data item with each of the second plurality of target attributes.

5. The method of claim 4, wherein:
the first query includes a first compound predicate that associates the first data item with each of the plurality of target attributes and a second compound predicate that associates the second data item with each of the second plurality of target attributes;
the first compound predicate and the second compound predicate are combined using a conjunctive AND.

6. The method of claim 4, wherein:
the plurality of target attributes is a first plurality of target attributes;
the first plurality of target attributes include first name and last name;
the first plurality of target attributes is the same as the second plurality of target attributes;
the first source attribute is first name and the second source attribute is last name.

7. The method of claim 1, wherein:
the first source attribute is job title;
the plurality of target attributes include previous job title and current job title.

8. The method of claim 1, wherein:
the first source attribute is organization name;
the plurality of target attributes include previous organization name and current organization name.

9. The method of claim 8, further comprising:
for a second data item, of the plurality of data items, that corresponds to a second source attribute of the plurality of source attributes, identifying a second plurality of target attributes;
wherein the first query associates the second data item with each of the second plurality of target attributes;
wherein the second source attribute is job title;
the second plurality of target attributes include previous job title and current job title.

10. A method comprising:
identifying a first entity record from a source database;
identifying, in the first entity record, a plurality of data items, each of which corresponds to an attribute of a plurality of source attributes;
for a first data item, of the plurality of data items, that corresponds to a first source attribute of the plurality of source attributes, identifying a plurality of target attributes;
generating a first query that includes a plurality of predicates, each predicate corresponding to a different data item-target attribute pair and including the first data item and a different target attribute of the plurality of target attributes;

wherein the plurality of predicates are combined with a disjunctive OR;
performing a first search of a target database based on the first query, wherein the first search results in a first set of results;
using a scoring model to generate a set of scores, one for each result in the first set of results;
determining whether the first entity record matches an entity record in the target database based on the set of scores generated by the scoring model;
generating a second query that is different than the first query;
performing a second search of the target database based on the second query, wherein the second search results in a second set of results;
wherein using the scoring model comprises using the scoring model to generate a score for each result in the first and second sets of results;
wherein the method is performed by one or more computing devices.

11. One or more storage media storing instructions which, when executed by one or more processors, cause:
identifying a first entity record from a source database;
identifying, in the first entity record, a plurality of data items, each of which corresponds to an attribute of a plurality of source attributes;
for a first data item, of the plurality of data items, that corresponds to a first source attribute of the plurality of source attributes, identifying a plurality of target attributes;
generating a first query that includes the plurality of data items and that associates the first data item with each of the plurality of target attributes;
generating a second query that is different than the first query;
performing a first search of a target database based on the first query, wherein the first search results in a first set of results;
performing a second search of the target database based on the second query, wherein the second search results in a second set of results;
using a scoring model to generate a set of scores, one score for each result in the first and second sets of results;
determining whether the first entity record matches an entity record in the target database based on the set of scores generated by the scoring model.

12. The one or more storage media of claim 11, wherein the instructions, when executed by the one or more processors, further cause:
for a second data item, of the plurality of data items, that corresponds to a second source attribute of the plurality of source attributes, identifying a second plurality of target attributes;
generating a first plurality of predicates, one for each target attribute of the second plurality of target attributes, wherein each predicate in the first plurality of predicates includes the second data item and is combined with each other predicate of first plurality of predicates with a disjunctive OR;
for a third data item, of the plurality of data items, that corresponds to a third source attribute of the plurality of source attributes, identifying a third plurality of target attributes;
generating a second plurality of predicates, one for each target attribute of the third plurality of target attributes, wherein each predicate in the second plurality of predicates includes the third data item and is combined with each other predicate of second plurality of predicates with the disjunctive OR;

wherein the second query includes the first plurality of predicates and the second plurality of predicates, wherein the first plurality of predicates and the second plurality of predicates are combined with the disjunctive OR.

13. The one or more storage media of claim 11, wherein:
generating the first query that includes generating a plurality of predicates, each predicate corresponding to a different data item-target attribute pair and including the first data item and a different target attribute of the plurality of target attributes;
the plurality of predicates are combined with a disjunctive OR.

14. The one or more storage media of claim 11, wherein the instructions, when executed by the one or more processors, further cause:
for a second data item, of the plurality of data items, that corresponds to a second source attribute of the plurality of source attributes, identifying a second plurality of target attributes;
wherein the first query associates the second data item with each of the second plurality of target attributes.

15. The one or more storage media of claim 14, wherein:
the first query includes a first compound predicate that associates the first data item with each of the plurality of target attributes and a second compound predicate that associates the second data item with each of the second plurality of target attributes;
the first compound predicate and the second compound predicate are combined using a conjunctive AND.

16. The one or more storage media of claim 14, wherein:
the plurality of target attributes is a first plurality of target attributes;
the first plurality of target attributes include first name and last name;
the first plurality of target attributes is the same as the second plurality of target attributes;
the first source attribute is first name and the second source attribute is last name.

17. The one or more storage media of claim 11, wherein:
the first source attribute is job title;
the plurality of target attributes include previous job title and current job title.

18. The one or more storage media of claim 11, wherein:
the first source attribute is organization name;
the plurality of target attributes include previous organization name and current organization name.

19. The one or more storage media of claim 18, wherein the instructions, when executed by the one or more processors, further cause:
for a second data item, of the plurality of data items, that corresponds to a second source attribute of the plurality of source attributes, identifying a second plurality of target attributes;
wherein the first query associates the second data item with each of the second plurality of target attributes;
wherein the second source attribute is job title;
the second plurality of target attributes include previous job title and current job title.

* * * * *